US009159300B2

(12) United States Patent
Omiya

(10) Patent No.: US 9,159,300 B2
(45) Date of Patent: Oct. 13, 2015

(54) SEAT LAYOUT DISPLAY APPARATUS, SEAT LAYOUT DISPLAY METHOD, AND PROGRAM THEREOF

(71) Applicant: P&W Solutions Co., Ltd., Tokyo (JP)

(72) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 92 days.

(21) Appl. No.: 14/074,610

(22) Filed: Nov. 7, 2013

(65) Prior Publication Data

US 2014/0176423 A1   Jun. 26, 2014

(30) Foreign Application Priority Data

Nov. 14, 2012   (JP) .................................. 2012-249853

(51) Int. Cl.
| | | |
|---|---|---|
| *G09G 5/00* | (2006.01) | |
| *G09G 5/37* | (2006.01) | |
| *G06F 3/0481* | (2013.01) | |
| *G06F 3/0485* | (2013.01) | |
| *G06F 3/0486* | (2013.01) | |

(52) U.S. Cl.
CPC .............. *G09G 5/37* (2013.01); *G06F 3/0481* (2013.01); *G06F 3/0485* (2013.01); *G06F 3/0486* (2013.01); *G06F 2203/04803* (2013.01); *G06F 2203/04806* (2013.01)

(58) Field of Classification Search
USPC ........ 345/4, 156, 632, 2.2, 173, 581; 715/769
See application file for complete search history.

(56) References Cited

U.S. PATENT DOCUMENTS

| | | | | |
|---|---|---|---|---|
| 6,031,545 A | * | 2/2000 | Ellenby et al. ................ | 345/632 |
| 2006/0066567 A1 | * | 3/2006 | Scharenbroch et al. ...... | 345/156 |
| 2011/0221655 A1 | * | 9/2011 | Fukui ................. | 345/4 |
| 2012/0327099 A1 | * | 12/2012 | Vojak ............................ | 345/581 |
| 2013/0033448 A1 | * | 2/2013 | Yano et al. ..................... | 345/173 |
| 2013/0063340 A1 | * | 3/2013 | Mondragon et al. .......... | 345/156 |
| 2013/0201126 A1 | * | 8/2013 | Mimura ........................ | 345/173 |
| 2014/0085166 A1 | * | 3/2014 | Hutchinson et al. ........... | 345/2.2 |
| 2015/0149943 A1 | * | 5/2015 | Nguyen et al. ................ | 715/769 |

FOREIGN PATENT DOCUMENTS

JP   2008-009713 A   1/2008

* cited by examiner

*Primary Examiner* — Thuy Pardo
(74) *Attorney, Agent, or Firm* — SoCal IP Law Group LLP; Steven C. Sereboff; John E. Gunther

(57) ABSTRACT

A display apparatus includes: a location acquisition unit that acquires an image location designated by an operation of the user in the planar image of the user symbol; a direction setting unit that specifies an area to which the image location of the user symbol belongs from among a plurality of areas into which the planar image is divided and with which a predetermined direction is associated in advance, respectively, and sets, as a direction of eyes of the user, a direction that is associated in advance with the area specified; and a display control unit that displays the planar image in which the seat symbols and the user symbol are arranged in such a way of being associated with a seat layout in a room visually recognized when the user views in the direction of eyes.

11 Claims, 8 Drawing Sheets

FIG. 2

SEAT LAYOUT DISPLAY APPARATUS, SEAT LAYOUT DISPLAY METHOD, AND PROGRAM THEREOF

This application is based on and claims the benefit of priority from Japanese Patent Application No. 2012-249853, filed on 14 Nov. 2012, the content of which is incorporated herein by reference.

BACKGROUND OF THE INVENTION

1. Field of the Invention

The present invention relates to an apparatus, a method, and a program for displaying a seat layout in a room.

2. Related Art

Conventionally, when designing or checking a seat layout or an arrangement of seats for staff in a room such as a company office or a call center, a planar image in which seat symbols are arranged is used. Locations of seat symbols in the planar image correspond to actual seats, respectively, and thus reflect positional relationships among the seats in the planar image (for example, refer to Japanese Unexamined Patent Application, Publication No. 2008-9713).

SUMMARY OF THE INVENTION

However, when many seats are arranged in a room, a seat layout that can be visually recognized at once is often a part of the overall seats. In such a case, it becomes difficult to recognize a location and a direction in a planar image corresponding to a user's actual location and the direction of the eyes of the user so as to associate a seat layout visually recognized by the user with a layout of the seat symbols in the planar image.

It is an object of the present invention to provide an apparatus, a method, and a program that can switch display of a seat layout conveniently.

The present invention provides the following means for solving the problems.

(First Aspect) A seat layout display apparatus, including: a display control unit that displays, on a display device, a planar image in which seat symbols showing seat locations in a room and a user symbol showing a user's location in the room are arranged; a location acquisition unit that acquires an image location designated by an operation of the user in the planar image of the user symbol; and a direction setting unit that specifies an area to which the image location acquired by the location acquisition unit belongs from among a plurality of areas into which the planar image is divided and with which a predetermined direction is associated in advance, respectively, and sets, as a direction of eyes of the user, a direction that is associated in advance with the area specified, in which the display control unit displays the planar image in which the seat symbols and the user symbol are arranged in such a way of being associated with a seat layout in the room visually recognized when the user views in the direction of eyes.

With such a configuration, the seat layout display apparatus determines a direction of display of the seat layout based on the direction of eyes that is associated in advance with the area to which the location of the user symbol belongs. In this way, the display apparatus can switch the display of the seat layout conveniently.

(Second Aspect) The seat layout display apparatus according to the first aspect, in which the predetermined direction is a relative direction with respect to a current arrangement of the seat symbols in the planar image.

With such a configuration, since the direction associated with the area is a relative direction with respect to the display of the current seat layout, the user can switch the display direction of the seat layout by moving the user symbol intuitively with respect to the current display screen.

(Third Aspect) The seat layout display apparatus according to the first aspect or the second aspect, in which the display control unit arranges the seat symbols relating to all of the seats in the room in the planar image.

With such a configuration, since the seat symbols relating to all of the seats in the room are arranged in the planar image showing the seat layout, the user can easily recognize the form of the seat layout.

(Fourth Aspect) The seat layout display apparatus according to one of the first aspect to the third aspect, in which the user symbol includes a plurality of direction symbols which indicate different directions, respectively, and when any one of the direction symbols is designated by way of an operation of the user, the direction setting unit updates the direction of eyes to a direction shown by the direction symbol designated.

With such a configuration, the seat layout display apparatus receives the selection of a plurality of direction symbols included in the user symbol and sets the direction shown by the direction symbol thus selected as the direction of eyes. In this way, the seat layout display apparatus can display the seat layout that suits the direction of eyes in the actual room without moving the image location of the user symbol displaying the user's standing location. Therefore, the seat layout display apparatus can easily display the entire seat layout that suits the user's actual view and can improve convenience.

(Fifth Aspect) The seat layout display apparatus according to the fourth aspect, in which each of the different directions, respectively, is a relative direction with respect to a current arrangement of the seat symbols in the planar image.

With such a configuration, since the direction indicated by the direction symbol is a relative direction with respect to the display of the current seat layout, the user can switch the display direction of the seat layout by selecting the direction symbol intuitively with respect to the current display screen.

(Sixth Aspect) The seat layout display apparatus according to one of the first aspect to the fifth aspect, in which the seat symbols include identification information relating to staff assigned to seats shown by the seat symbols, and the display control unit causes the seat symbol to rotate in accordance with the direction of eyes and changes a display mode of the identification information.

With such a configuration, the seat layout display apparatus causes the seat symbols to rotate as the seat layout rotates and changes the display mode of information displayed in the seat symbols. In this way, the seat layout display apparatus rotates character display or employs a layout that suits the current form of the seat symbols, which can improve the user's visibility.

(Seventh Aspect) The seat layout display apparatus according to one of the first aspect to the sixth aspect, in which the location acquisition unit accepts a drag operation by the user on the user symbol, and in which the display control unit displays which area the user symbol currently belongs to at least during the drag operation.

With such a configuration, the seat layout display apparatus receives the user's drag operation upon acquiring the image location of the user symbol and displays the area to which the user symbol currently belongs while moving the user symbol, which can improve the user's operation performance.

(Eighth Aspect) The seat layout display apparatus according to the seventh aspect, in which the display control unit displays boundaries of the plurality of areas at least during the drag operation.

With such a configuration, since the seat layout display apparatus receives the user's drag operation upon acquiring the image location of the user symbol and displays the boundaries of the areas while moving the user's symbol, it is possible to improve the user's operation performance.

(Ninth Aspect) The seat layout display apparatus according to one of the first aspect to the eighth aspect, in which the display control unit zooms in on at least a part of the planar image according to an operation of the user.

With such a configuration, since the seat layout display apparatus can zoom in on the entire planar image or a part of the planar image according to the user's operation, it is possible to improve the visibility of the seat symbols and the user can easily recognize the information relating to the seats.

(Tenth Aspect) A seat layout display method of displaying, on a display device, a planar image in which seat symbols showing seat locations in a room and a user symbol showing a user's location in the room are arranged; the method including: a location acquisition step that acquires an image location designated by an operation of the user in the planar image of the user symbol; a direction setting step that specifies an area to which the image location acquired by the location acquisition unit belongs from among a plurality of areas into which the planar image is divided and with which a predetermined direction is associated in advance, respectively, and sets, as a direction of eyes of the user, a direction that is associated in advance with the area specified, and a display control step that displays the planar image in which the seat symbols and the user symbol are arranged in such a way of being associated with a seat layout in the room visually recognized when the user views in the direction of eyes.

With such a configuration, an operational effect similar to that of the first aspect can be expected by having a computer to execute the seat layout display method.

(Eleventh Aspect) A non-transitory computer-readable medium encoded with a seat layout display program for displaying, on a display device, a planar image in which seat symbols showing seat locations in a room and a user symbol showing a user's location in the room are arranged, that enables a computer to execute: a location acquisition step that acquires an image location designated by an operation of the user in the planar image of the user symbol; a direction setting step that specifies an area to which the image location acquired by the location acquisition unit belongs from among a plurality of areas into which the planar image is divided and with which a predetermined direction is associated in advance, respectively, and sets, as a direction of eyes of the user, a direction that is associated in advance with the area specified, and a display control step that displays the planar image in which the seat symbols and the user symbol are arranged in such a way of being associated with a seat layout in the room visually recognized when the user views in the direction of eyes.

With such a configuration, an operational effect similar to that of the first aspect can be expected by having a computer to execute the seat layout display program.

In accordance with the present invention, it is possible to switch a display of a seat layout conveniently.

BRIEF DESCRIPTION OF THE DRAWINGS

FIG. 2 is a diagram showing a screen display example of a planar image according to the embodiment;

DETAILED DESCRIPTION OF THE INVENTION

An embodiment of the present invention is described in the following.

A display apparatus 1 according to the present embodiment (seat layout display apparatus) is an apparatus that displays, on a screen, a seat layout and information of staff assigned to seats in a contact center.

Figure 1:
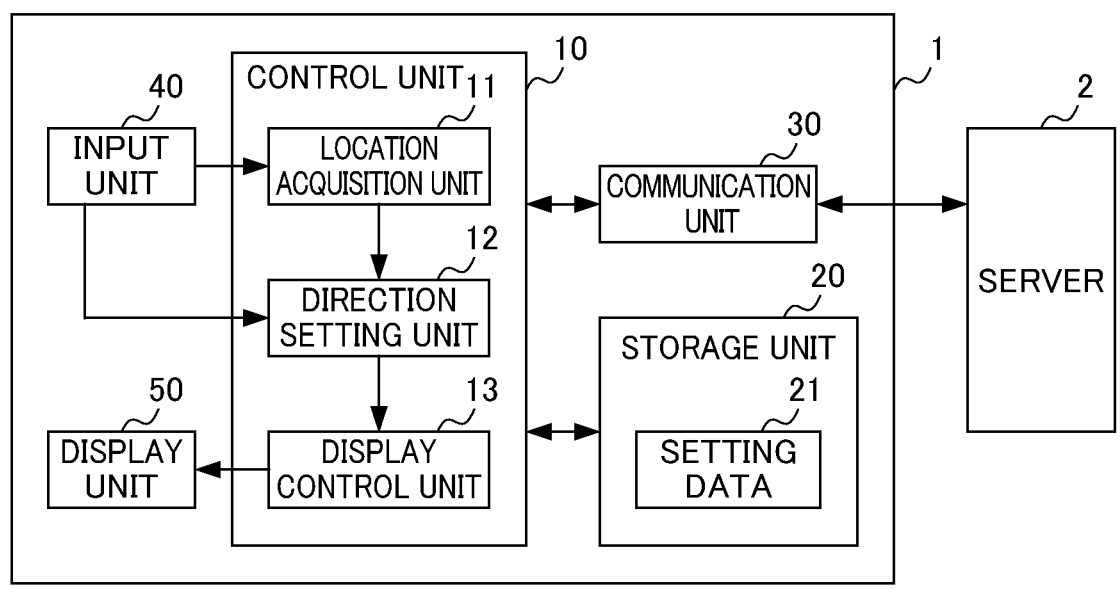
FIG. 1 is a block diagram showing a functional configuration of a display apparatus according to an embodiment.

FIG. 1 is a block diagram showing a functional configuration of the display apparatus 1 according to the present embodiment.

The display apparatus 1 includes a control unit 10, a storage unit 20, a communication unit 30, an input unit 40, and a display unit 50.

The control unit 10 is a portion that controls the entire display apparatus 1 and realizes various functions of the present embodiment by reading and executing various programs stored in the storage unit 20 appropriately so as to cooperate with the abovementioned hardware. The control unit 10 may be CPU (Central Processing Unit). It should be noted that the function of each unit included in the control unit 10 is described later.

The storage unit 20 is a storage area for various programs and various pieces of data, etc. for allowing a group of hardware to function as the display apparatus 1 and may be a hard disk drive (HDD), flash memory, or the like. More specifically, the storage unit 20 stores a program that allows the control unit 10 to realize various functions of the present embodiment (seat layout display program).

Furthermore, the storage unit 20 stores setting data 21 used for control of display by the control unit 10.

The communication unit 30 is a network adapter for sending data to and receiving data from another apparatus. The communication unit 30 performs data communication with a predetermined server 2 that manages a seat layout and seat assignment via a network.

The input unit 40 is an interface device that receives an instruction input by a user of the display apparatus 1, for example, a manager at a contact center. The input unit 40 is configured with, for example, a keyboard, a mouse, a touch panel, etc.

The display unit 50 is a display apparatus (display device) that displays a screen for receiving an input of data by a user and a screen of a processing result by the display apparatus 1 in accordance with display control of the control unit 10. The display unit 50 may be a display apparatus such as a CRT (cathode-ray tube) display, an LCD (liquid crystal display), or an organic EL display.

The display unit 50 displays a planar image in which seat symbols showing seat locations in a room and a user symbol showing a user location in the room are arranged in accordance with display control of the control unit 10.

Figure 2:
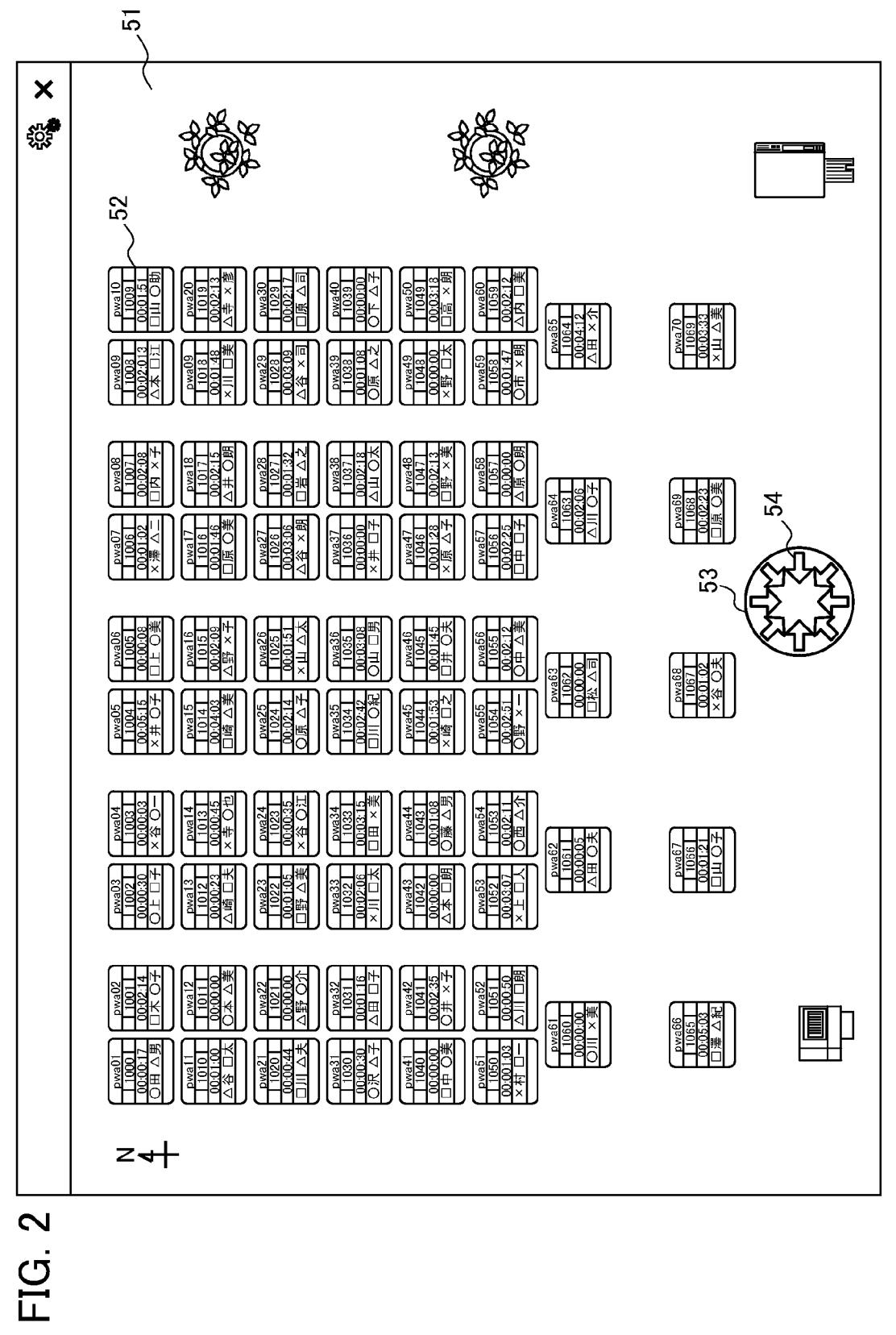

FIG. 2 is a diagram showing a screen display example of a planar image according to the present embodiment.

A plurality of seat symbols 52 and a user symbol 53 are arranged in a planar image 51.

The seat symbols 52 indicate information such as ID, name, extension number, and call duration as information of staff assigned to each seat as well as the location of the seat.

The user symbol 53 indicates a location of a user in the room. In this screen display example, a seat layout is displayed which corresponds to a case in which a user sees a room while facing north.

Furthermore, the user symbol 53 includes a plurality of direction symbols 54 that indicate different directions, respectively. In this example, direction symbols 54 showing eight directions, respectively, are illustrated as arrows.

Next, functions of the control unit 10 are described in detail.

The control unit 10 includes a location acquisition unit 11, a direction setting unit 12, and a display control unit 13. These units are functional blocks that are realized by the control unit 10 executing the seat layout display program.

The location acquisition unit 11 acquires an image location of the user symbol 53 designated by a user operation in the planar image 51. More specifically, the location acquisition unit 11 receives a drag operation by a user for the user symbol 53 arranged in the planar image 51 and acquires an image location of the user symbol 53 when the drag operation ends.

The direction setting unit 12 specifies an area to which an image location acquired by the location acquisition unit 11 belongs from among a plurality of areas into which the planar image 51 is divided. A predetermined direction is associated with each area beforehand and the direction setting unit 12 sets a direction that is associated beforehand with the area thus specified as a direction of eyes of the user.

Figure 3:
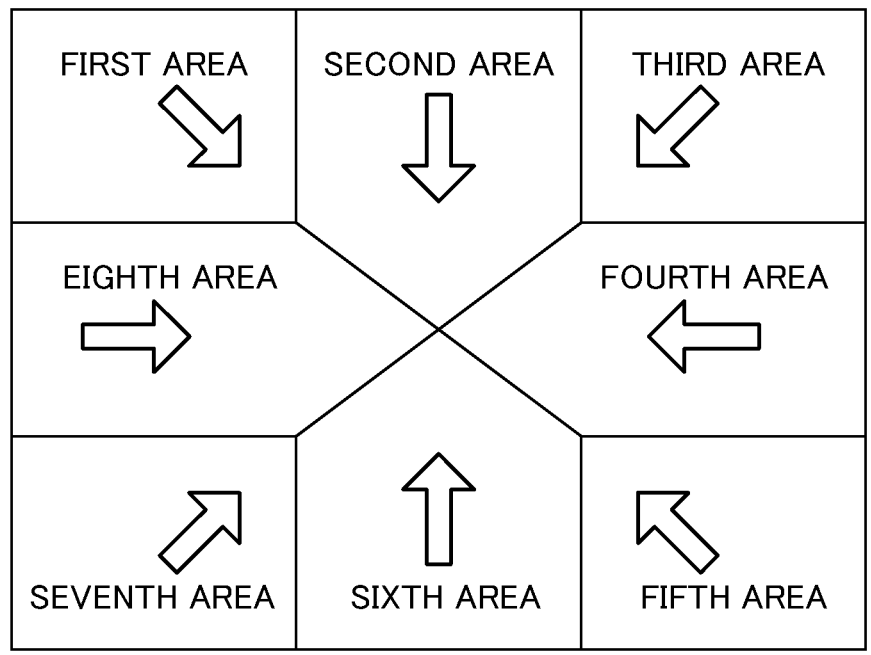
FIG. 3 is a diagram showing an example of a division of a planar image according to the embodiment.

FIG. 3 is a diagram showing an example of a division of a planar image according to the present embodiment.

In this example, the planar image is divided into eight areas from the first area to the eighth area. For example, the first area is associated with a direction from upper left to lower right, and the second area is associated with a direction from top to bottom. Similarly, predetermined different directions are respectively associated with the first area to the eighth area.

It should be noted that the number of divided areas is not limited to eight and the number thereof may be appropriately set such as four, twelve, and sixteen.

Here, a predetermined direction refers to a relative direction with respect to the current arrangement of the seat symbols 52 in the planar image 51. In other words, for example, the direction of eyes which view the seat layout from upper right is set to the currently displayed seat layout form for the third area, and the direction of eyes which view the seat layout from right is set to the currently displayed seat layout form for the fourth area. Therefore, a direction of eyes associated with an area is not fixed to a single direction of all directions in an actual room.

Furthermore, when any one of the direction symbols 54 is designated by way of a user's operation, i.e. when an arrow is tapped or clicked, the direction setting unit 12 updates the direction of eyes to set to the direction shown by the designated direction symbol 54.

The display control unit 13 displays, on the display unit 50, the planar image 51 in which the seat symbol 52 and the user symbol 53 are arranged in such a way of being associated with the seat layout in the room visually recognized when the user views in the direction of eyes set by the direction setting unit 12.

At this moment, the display control unit 13 arranges the seat symbols 52 relating to all of the seats in the room on the planar image 51. That is to say, the seat symbols 52 are arranged on the planar image 51 even for seats located more behind with respect to the direction of eyes than the user symbol 53. Furthermore, the planar image 51 may be magnified or reduced compared to that before display switch for the purpose of displaying the image entirely.

Figure 4:
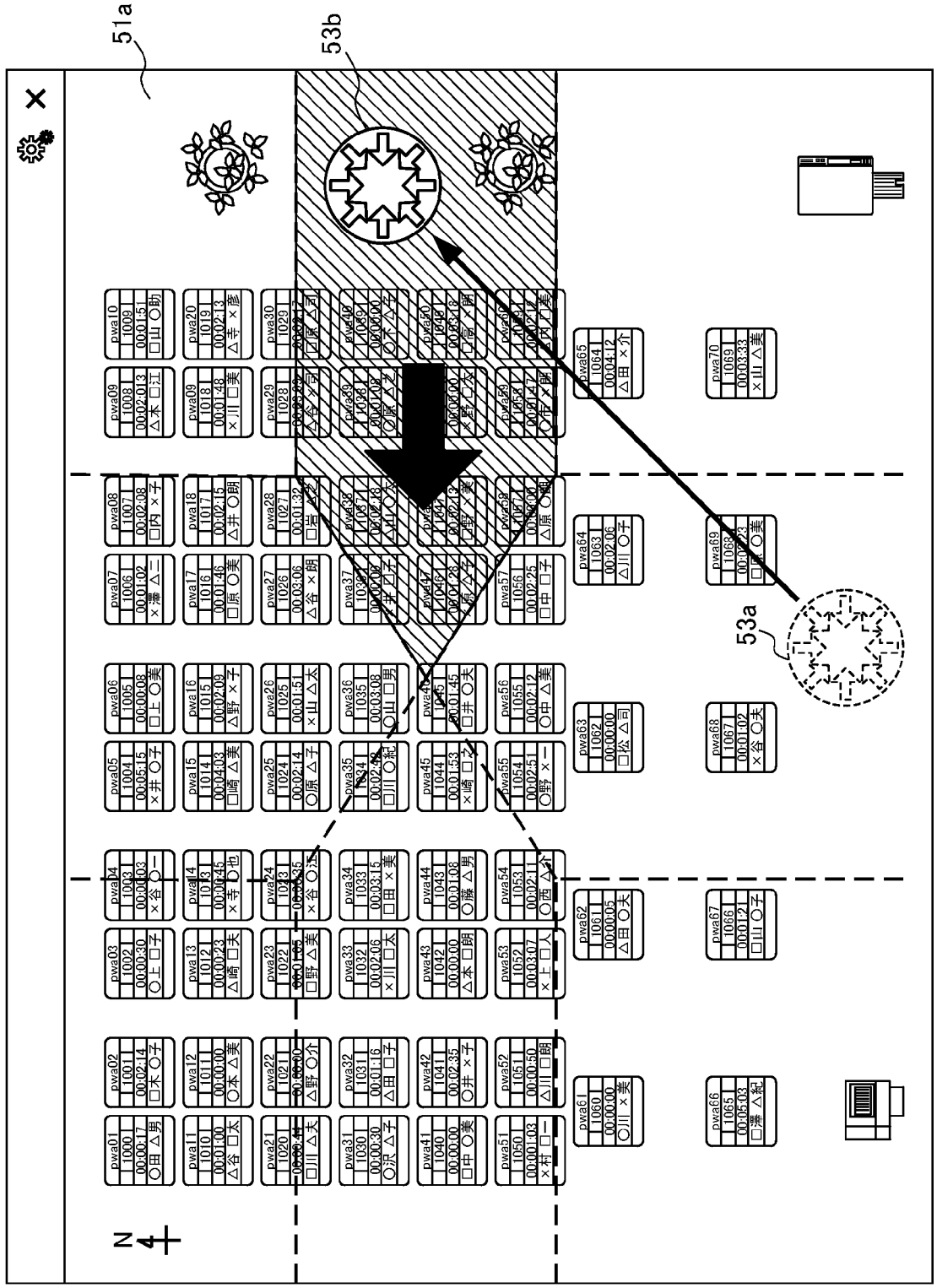
FIG. 4 is a diagram showing a screen display example in which a user symbol according to the embodiment is traveling.

FIG. 4 is a diagram showing a screen display example in which the user symbol 53 according to the present embodiment is traveling.

In this example, the user symbol 53a located in the sixth area travels by way of dragging to the location of the user symbol 53b in the fourth area.

At this moment, the display control unit 13 displays which area the user symbol 53 currently belongs to at least during the drag operation of the user symbol 53. In this example, the fourth area where the user symbol 53b is currently located is illustrated with hatching, and furthermore, the direction of eyes associated with is displayed with an arrow. It should be noted that the display mode for areas is not limited to this and a display mode such as coloring or outlining may be appropriately set.

Furthermore, the display control unit 13 displays boundaries of a plurality of areas at least during the drag operation of the user symbol 53. In this example, boundary lines dividing each area from the first area to the eighth area are displayed.

Figure 5:
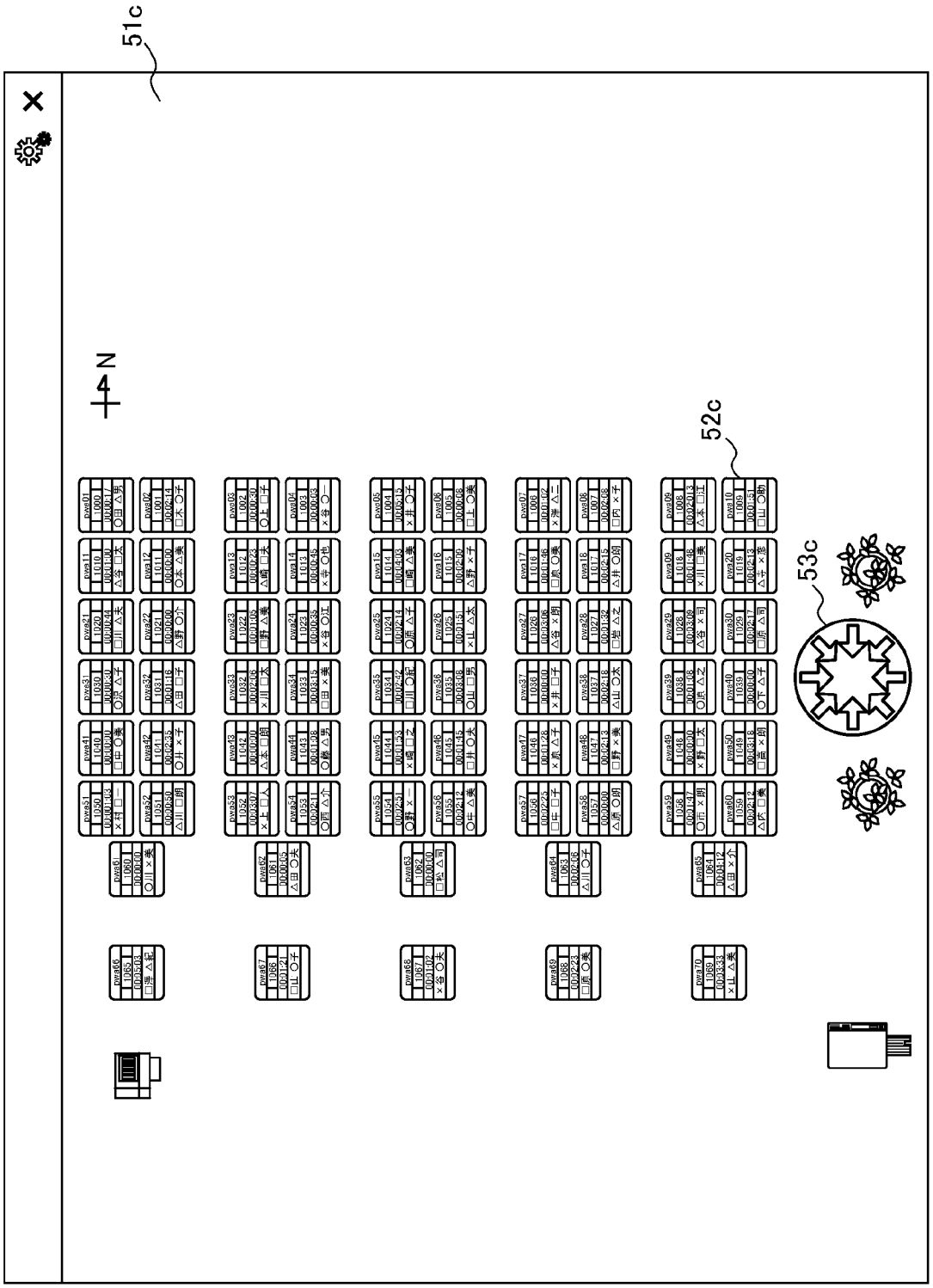
FIG. 5 is a diagram showing a screen display example after a user symbol according to the embodiment travels.

FIG. 5 is a diagram showing a screen display example after the user symbol 54 according to the present embodiment travels.

This screen display example shows a planar image 51c in a case in which the user symbol 53a of FIG. 4 travels to the location of the user symbol 53b.

The area where the user symbol 53b is located is associated with the direction from right to left on the planar image 51a of FIG. 4. In other words, a seat layout is displayed corresponding to a case of viewing a room from east toward west.

As a result of this, the user symbol 53c travels to a lower portion of the screen and the seat layout displayed is set to be the planar image 51c which is set by rotating the planar image 51a in a clockwise direction.

At this moment, the display control unit 13 causes the seat symbol 52 to rotate in accordance with the direction of eyes and changes a display mode of identification information as necessary. For example, characters included in a seat symbol 52c on the planar image 51c of FIG. 5 relatively rotate with respect to the seat layout, compared to the seat symbol 52a of FIG. 4. Furthermore, for example, in a case of the seat symbol 52 being substantially a square, the amount of information or display method may be changed so that the characters included in the seat symbol 52 are not displayed obliquely in a case of a seat layout being viewed in a direction such as northeast, northwest, southeast, southwest, etc.

Figure 6:
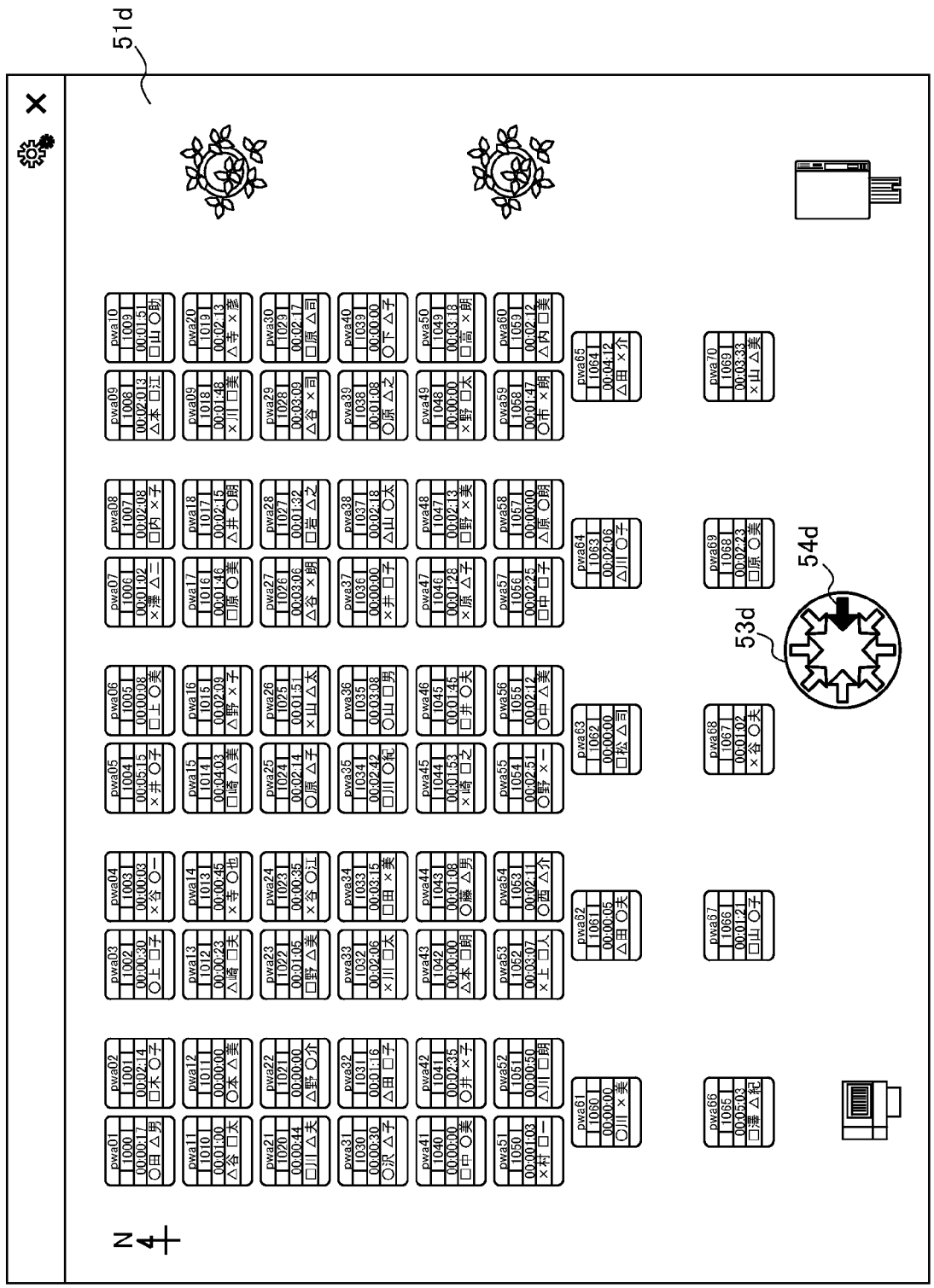
FIG. 6 is a diagram showing a screen display example when a direction symbol according to the embodiment is designated.

FIG. 6 is a diagram showing a screen display example when the direction symbol 54 according to the present embodiment is designated.

The user symbol 53d that is arranged in the planar image 51d includes eight direction symbols 54 expressed by arrow shapes. When one of the direction symbols 54d is designated by a user's tap operation, etc., the display mode of the direction symbols 54d thus designated is changed so as to be highlighted.

Here, each of the different directions shown by the plurality of direction symbols 54 refers to a relative direction with respect to the current arrangement of the seat symbols 52 in the planar image. For example, the direction symbol 54d, which is an arrow facing left in FIG. 6, shows a direction from east toward west in an actual room. On the other hand, the direction symbol 54 of FIG. 5, which is an arrow facing left, shows a direction from north toward south in the actual room. In this way, the actual directions such as north, south, east, and west shown by the direction symbol 54 change depending on the current direction of the seat layout.

Figure 7:
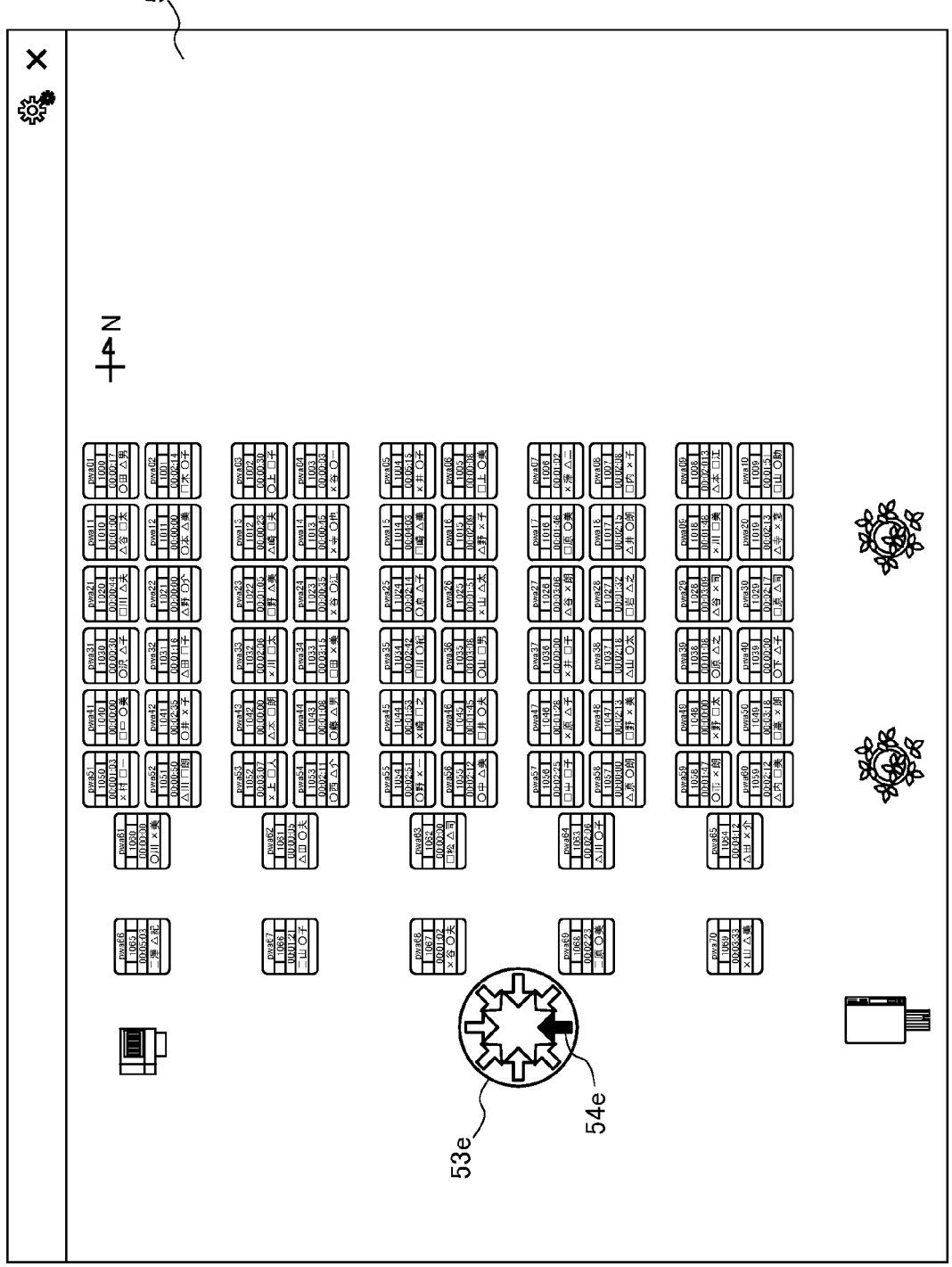
FIG. 7 is a diagram showing a screen display example after a direction symbol according to the embodiment is designated.

FIG. 7 is a diagram showing a screen display example after the direction symbol 54 according to the present embodiment is designated.

This screen display example shows a planar image 51e after the direction symbol 54d of FIG. 6 is designated.

Since the direction from east toward west is associated with the direction symbol 54d, a seat layout is displayed which corresponds to a case of being viewed in this direction.

At this time, the relative location of the user symbol 53e with respect to the seat layout does not change and the user symbol 53e is arranged at the left part of the planar image 51e as the seat layout rotates. Furthermore, the direction symbol 54e showing the same direction as the direction symbol 54d is highlighted.

Furthermore, the display control unit 13 zooms in on (enlarges) at least a part of a planar image according to a user's operation in a state in which the planar image of a seat layout is displayed.

More specifically, the display control unit 13 zooms in on the entire seat layout, and if the planar image becomes bigger than the display area of the display unit 50 as a result of this, scroll display is made possible. Furthermore, for a part of the seat layout, the display unit 13 zooms in on the periphery of the location designated by a user's tap operation, for example.

Figure 8:
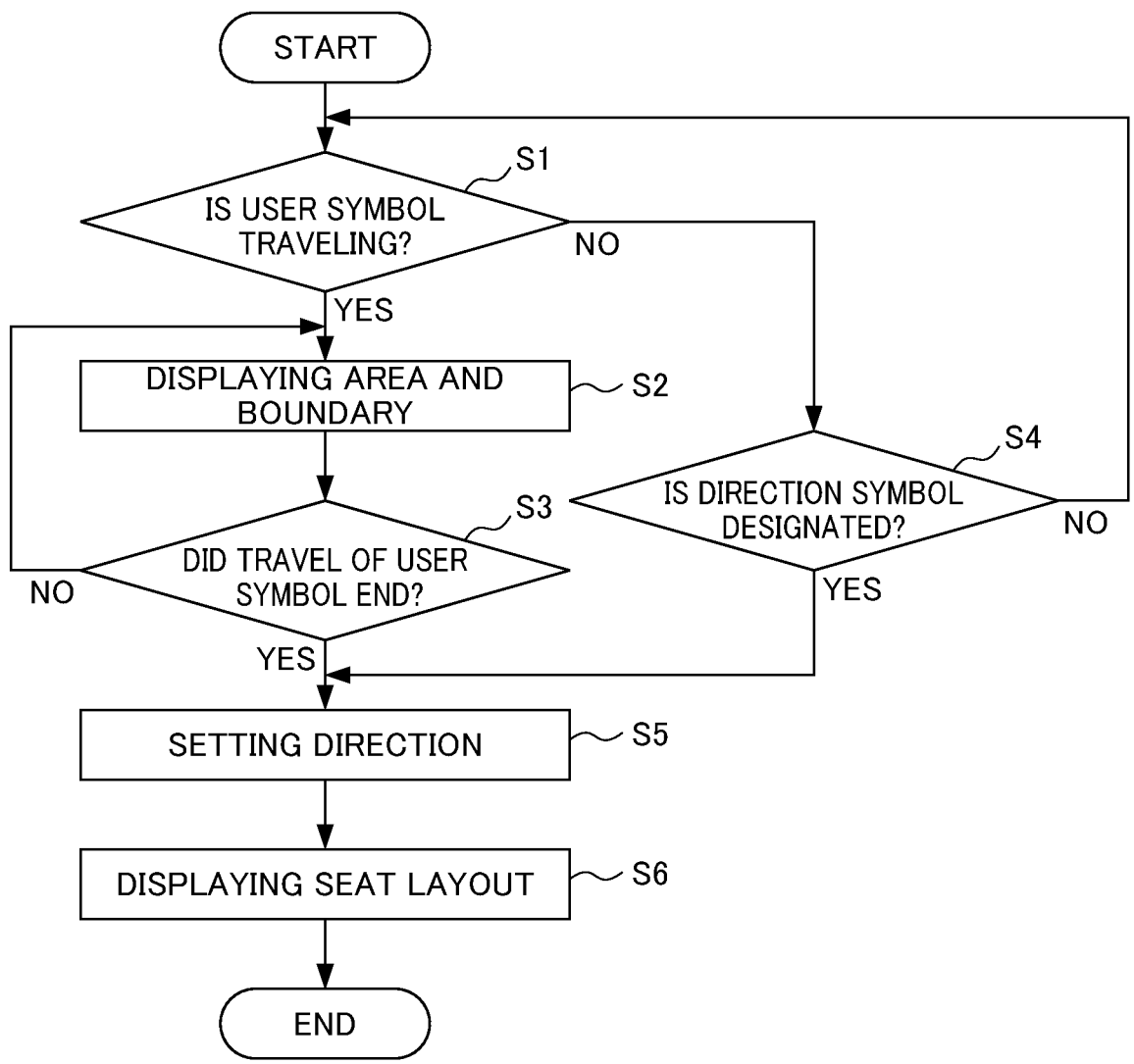
FIG. 8 is a flowchart showing a method for performing display switch of a seat layout according to the embodiment.

FIG. 8 is a flowchart showing a method for performing display switch of a seat layout by the display apparatus 1 according to the present embodiment.

In Step S1, the control unit 10 (location acquisition unit 11) determines whether a user is moving the user symbol 53 by a drag operation, etc. In a case of a YES determination, the processing advances to Step S2, and in a case of a NO determination, the processing advances to Step S4.

In Step S2, the control unit 10 (display control unit 13) displays boundaries of a plurality of areas with which different directions of eyes are associated respectively and an area where the current user symbol 53 is located.

In Step S3, the control unit 10 (location acquisition unit 11) determines whether the movement of the user symbol 53 ends. In a case of a YES determination, the processing advances to Step S5, and in a case of a NO determination, the processing returns to Step S2.

In Step S4, the control unit 10 (direction setting unit 12) determines whether any one from among the direction symbols 54 included in the user symbol 53 is designated. In a case of a YES determination, the processing advances to Step S5 and in a case of a NO determination, the processing returns to Step S1.

In Step S5, the control unit 10 (direction setting unit 12) sets a direction associated with an area to which the user symbol 53 is moved or a direction designated by the direction symbol 54 as a direction of eyes of the user.

In Step S6, the control unit 10 (display control unit 13) generates a planar image of a seat layout based on the location of the user symbol 53 thus acquired and the direction of eyes thus set so as to display the planar image on the display unit 50.

As described above, according to the present embodiment, the display apparatus 1 determines a direction of display of a seat layout based on the direction of eyes associated in advance with an area to which the location the user symbol 53 belongs. In this way, the display apparatus 1 can easily switch the display of a seat layout according to a user's standing location and a direction of eyes conveniently for the purpose of information monitoring. At this time, since the display apparatus 1 does not change the form of the seat symbol 52, which reduces processing load, the display apparatus 1 thus can display the seat layout effectively.

Here, the display apparatus 1 may construct a virtual three-dimensional space corresponding to an actual room and, in a state in which three-dimensional objects as the seat symbols 52 are arranged in the virtual three-dimensional space, may display an image showing an aspect when viewing in a predetermined direction from a predetermined point of view, which is the center of the user symbol 53 (hereinafter, referred to as "three-dimensional image").

However, it is preferable for information relating to a seat layout and staff assigned to seats at a contact center to be understood by a user instantly and the entire seat layout in a room to be viewed at once. In consideration of this aspect, for a display target of the display apparatus 1, a planar image 51 of the present embodiment is more preferable in which the entire room can be visually recognized intuitively with a two-dimensional layout which can update display instantly with less processing load and is simple, compared to a three-dimensional image.

In addition, since a direction associated with an area is a relative direction with respect to a display of a current seat layout, a user can move a user symbol 53 intuitively with respect to a current display screen to switch a display direction of the seat layout.

Furthermore, since the seat symbols 52 relating to all of the seats in the room are arranged in the planar image 51 showing the seat layout, a user can easily recognize the form of the seat layout.

Furthermore, the display apparatus 1 receives a selection from a plurality of direction symbols 54 included in the user symbol 53 and sets the direction indicated by the direction symbol 54 thus selected as the direction of eyes. In this way, the display apparatus 1 can display a seat layout that suits the direction of eyes in an actual room without moving an image location of the user symbol 53 displaying a user's standing location. Therefore, the display apparatus 1 can easily display the entire seat layout that suits the user's actual viewing, a result of which a user's convenience can improve.

Since the direction indicated by this direction symbol 54 is a relative direction with respect to the display of the current seat layout, a user can select the direction symbol 54 intuitively with respect to the current display screen to switch the display direction of the seat layout.

Furthermore, the display apparatus 1 rotates the seat symbol 52 as the seat layout rotates, and changes the display mode of information displayed in this seat symbol 52. In this way, the display apparatus 1 can improve a user's visibility by way of rotating the display of characters or adopting a layout that suits a current form of the seat symbol 52.

Furthermore, since the display apparatus 1 accepts a drag operation by a user upon acquiring an image location of the user symbol 53 and displays an area to which the user symbol 53 belongs and boundaries of areas, a user's operation performance can be improved.

Furthermore, since the display apparatus 1 can zoom in on an entire planar image or a part of the planar image in accordance with a user's operation, the visibility of the seat symbol 52 improves and the user can easily recognize information relating to a seat.

Although the embodiment of the present invention is described as above, the present invention is not limited to that embodiment. Furthermore, the effects described in the present embodiment are merely exemplified as the most preferable effects derived from the present invention. Therefore, the effects derived from the present invention are not limited to those described in the present embodiment.

Although the seat symbols 52 in the present embodiment are in substantially a square shape, the present invention is not limited thereto. For example, a polygonal shape or a circle may be employed. In such a case, an image of the seat symbol 52 may not be changed irrespective of a direction of eyes set. This reduces processing load.

Furthermore, although the display apparatus 1 arranges all of the seat symbols 52 in the room on the planar image irrespective of where the image of the user symbol 53 is located, the present invention is not limited thereto. For example, the seat symbols 52 located more behind with respect to the direction of eyes than the user symbol 53 may not be displayed, in accordance with the seat layout when viewing from an actual location in a room corresponding to the image location of the user symbol 53. In this way, displaying a predetermined area with the user's standing location as a reference facilitates the association with an actual view by a user.

The display apparatus 1 may be a variety of information processing apparatuses (computer) such as a server apparatus, a PC (Personal Computer), and a tablet terminal, in which the abovementioned functions are realized by software. In a case of being realized by software, programs constituting the software are installed to an information processing apparatus. Furthermore, these programs may be recorded in removable media such as a CD-ROM to be distributed, or may be downloaded via a network to an information processing apparatus to be distributed.

What is claimed is:

1. A seat layout display apparatus, comprising:
   a display control unit that displays, on a display device, a planar image including seat symbols designating seat locations in a room and a user symbol designating a user's location in the room;
   a location acquisition unit that acquires an image location designated by an operation of the user on the user symbol included in the planar image; and
   a direction setting unit that
      identifies an area to which the image location acquired by the location acquisition unit belongs from among a plurality of areas into which the planar image is divided, each of the plurality of areas associated with a respective predetermined direction, and
      sets, as a designated line of sight of the user, the respective predetermined direction associated with the identified area,
   wherein the display control unit revises the planar image by arranging the seat symbols and the user symbol to show the seat locations in the room as seen along the designated line of sight of the user.

2. The seat layout display apparatus according to claim 1, wherein
   each predetermined direction is a relative direction with respect to a current arrangement of the seat symbols in the planar image.

3. The seat layout display apparatus according to claim 1, wherein
   the display control unit arranges the seat symbols relating to all of the seats in the room in the planar image.

4. The seat layout display apparatus according to claim 1, wherein
   the user symbol includes a plurality of direction symbols which indicate different directions, respectively, and
   when any one of the direction symbols is designated by way of an operation of the user, the direction setting unit updates the designated line of sight of the user to a direction shown by the direction symbol designated.

5. The seat layout display apparatus according to claim 4, wherein
   each of the different directions, respectively, is a relative direction with respect to a current arrangement of the seat symbols in the planar image.

6. The seat layout display apparatus according to claim 1, wherein
   the seat symbols include identification information relating to staff assigned to seats shown by the seat symbols, and
   the display control unit causes each of the seat symbols to rotate in accordance with the designated line of sight of the user and changes a display mode of the identification information.

7. The seat layout display apparatus according to claim 1, wherein
   the location acquisition unit accepts a drag operation by the user on the user symbol, and
   the display control unit displays which area the user symbol currently belongs to at least during the drag operation.

8. The seat layout display apparatus according to claim 7, wherein
   the display control unit displays boundaries of the plurality of areas at least during the drag operation.

9. The seat layout display apparatus according to claim 1, wherein
   the display control unit zooms in on at least a part of the planar image according to an operation of the user.

10. A seat layout display method of displaying, on a display device, a planar image including seat symbol designating seat locations in a room and a user symbol designating a user's location in the room, the method comprising:
    a location acquisition step that acquires an image location designated by an operation of the user on the user symbol included in the planar image;
    a direction setting step that
       identifies an area to which the image location acquired by the location acquisition unit belongs from among a plurality of areas into which the planar image is divided, each of the plurality of areas associated with a respective predetermined direction is associated, and
       sets, as a designated line of sight of the user, the respective predetermined direction associated with the identified area, and
    a display control step that revises the planar image by arranging the seat symbols and the user symbol to show the seat locations in the room as seen along the designated line of sight of the user.

11. A non-transitory computer-readable medium encoded with a seat layout display program for displaying, on a display device, a planar image including seat symbols designating seat locations in a room and a user symbol designating a user's location in the room, that enables a computer to execute:
- a location acquisition step that acquires an image location designated by an operation of the user on the user symbol included in the planar image;
- a direction setting step that
  - identifies an area to which the image location acquired by the location acquisition unit belongs from among a plurality of areas into which the planar image is divided, each of the plurality of areas associated with a respective predetermined direction is associated, and
  - sets, as a designated line of sight of the user, the respective predetermined direction associated with the identified area, and
- a display control step that revises the planar image by arranging the seat symbols and the user symbol to show the seat locations in the room as seen along the designated line of sight of the user.

* * * * *